July 11, 1961 HEINZ-ERHARDT ANDERSEN 2,991,981
CYCLONES
Filed Oct. 15, 1957
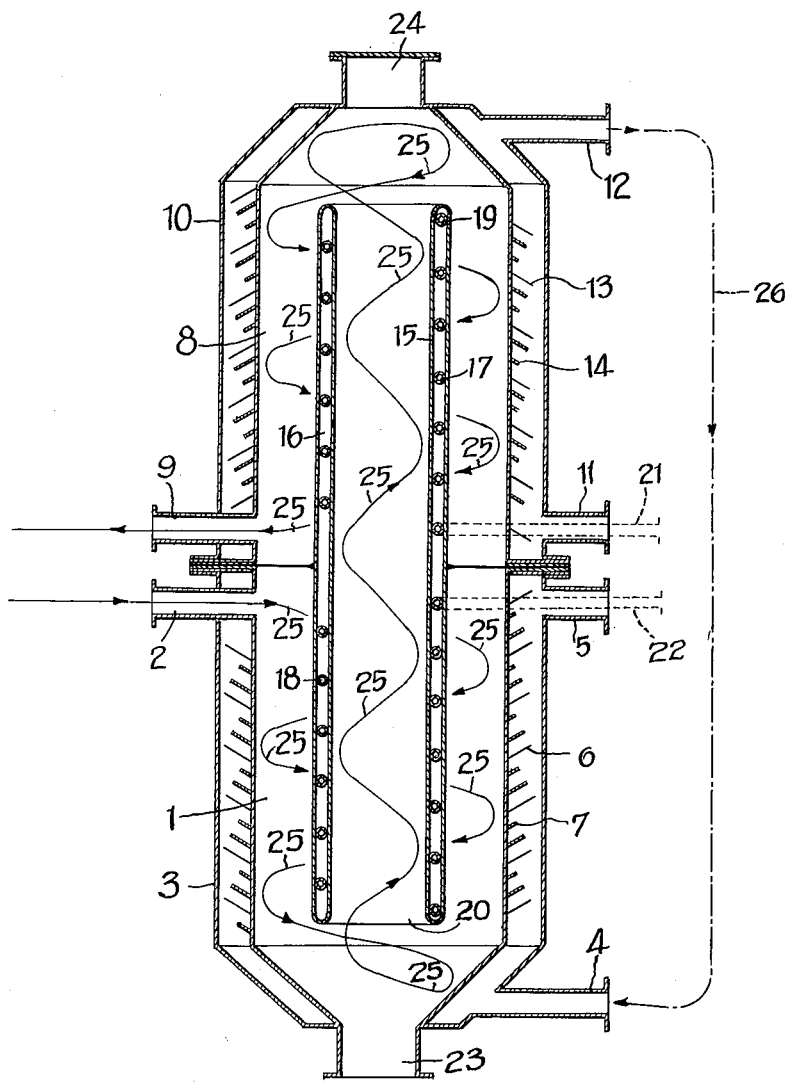
INVENTOR
Heinz-Erhardt Andersen
BY Connolly and Hutz
ATTORNEYS

United States Patent Office 2,991,981
Patented July 11, 1961

2,991,981
CYCLONES
Heinz-Erhardt Andersen, Burghausen, Upper Bavaria, Germany, assignor to Farbwerke Hoechst Aktiengesellschaft vormals Meister Lucius & Brüning, Frankfurt am Main, Germany, a corporation of Germany
Filed Oct. 15, 1957, Ser. No. 690,385
Claims priority, application Germany Oct 19, 1956
7 Claims. (Cl. 257—241)

This invention relates to cyclones.

The velocity of flow of a fluid in a cyclone is determined by the principle of the conservation of angular momentum, which requires that the product of the tangential component of the linear velocity of the fluid in a small volume and the distance of that volume from the axis about which the fluid is rotating shall remain constant. Therefore, as the fluid flows towards the axis of the cyclone, its tangential component of velocity increases, which produces an increase in the kinetic energy of the fluid. The principle of the conservation of energy requires (neglecting changes in the internal energy of the fluid) that this increase in kinetic energy shall be balanced by a corresponding decrease in the pressure energy of the fluid.

Accordingly, when a fluid flows from the tangential inlet to the axial outlet of a conventional cyclone, the rotational velocity of the fluid increases and the pressure of the fluid decreases. Thus the fluid leaving the apparatus has a large rotational energy (which is usually subsequently dissipated by friction) and the pressure energy of the fluid is not recovered. This means that there is a very large pressure drop across the cyclone so that, especially when two or more cyclones are connected in series, a very high pressure difference has to be provided.

For most applications (for example, carrying out endothermic and exothermic chemical reactions in which the wall of the apparatus plays no part, effecting heat exchange between fluids in jacketed cyclones, and separating solids from a fluid medium or liquids from a gaseous medium) the increased velocity of the fluid is required only within the cyclone. For such applications, it is therefore desirable, in order to reduce the pressure drop across the cyclone that at least a part of the rotational energy of the fluid should be reconverted into pressure energy after the fluid has entered the axial outlet.

This invention provides a cyclone apparatus which comprises a pair of co-axially disposed axially symmetrical chambers, a tube that is mounted co-axially with the chambers and protrudes into the chambers to provide communication between the interiors of the chambers, a tangential fluid inlet in one of the chambers, and a tangential fluid outlet in the other of the chambers. The cross-sections of both the tangential fluid inlet and the tangential fluid outlet may be of any desired shape.

The invention also provides a cyclone apparatus which comprises an axially symmetrical vessel sub-divided into two chambers by means of a partition that extends in a direction perpendicular to the axis of the vessel, a tube that is mounted co-axially with the vessel and passes through the partition into each of the chambers to provide communication between the interiors of the chambers, a tangential fluid inlet in one of the chambers, and a tangential fluid outlet in the other of the chambers. The cross-sections of both the tangential fluid inlet and the tangential fluid outlet may be of any desired shape.

In operation, the fluid passes through the inlet into the first chamber where it flows in a spiral path about the axis of the apparatus to the tube. Because the fluid in the tube is close to the axis of rotation of the fluid it has a low pressure energy and a high rotational velocity. The fluid flows along the tube and emerges into the chamber where it follows a spiral path to the tangential outlet. Because the outlet is situated remotely from the axis of rotation of the fluid, the fluid in the outlet has a low rotational velocity and a large pressure energy. Thus the pressure energy lost in the first chamber is recovered in the second.

The cyclone apparatus may be used for effecting the exchange of heat between fluids, for mixing or emulsifying, or for separating solid substances from fluids, and it may be used with especial advantage in a plant used for cracking oils. Thus, for example, the apparatus may be used for evaporating water, or for effecting the exchange of heat between steam and gases obtained from the cracking of hydrocarbon or between super-heated steam and saturated steam or between gases for which, either because the gases are contaminated or because it is desired to avoid a large pressure drop, the exchange of heat cannot be carried out in the usual tubular condensers.

In the form of cyclone apparatus in which the chambers are formed in a single vessel, the fluid inlet and the fluid outlet are advantageously each substantially adjacent to the partition.

In order to enable the cyclone apparatus to be used as a heat exchanger, there may be provided a jacket surrounding the vessel and a continuous helical guide situated between the jacket and the vessel. There may also be provided, between the jacket and the vessel, discontinuous ribs which are preferably staggered.

In order to enable heat to be supplied or extracted from the tube, the tube may have a double wall through which a fluid can be passed. Advantageously, there is provided between the walls of the tube two coils of pipe, one in each chamber, the coils being arranged so that they form a helical guide for fluid flowing between the walls and outside the pipes.

The distance which the tube extends into each chamber may be equal to at least half the length of the chamber and is advantageously equal to at least three quarters of the length of the chamber. Each of the chambers may be cylindrical or conical in shape. The chambers may be of the same or different capacities; in order to obtain different capacities the chambers may be constructed in such a manner that they are of different length and/or diameter.

Advantageously, the cyclone apparatus is mounted with its axis vertical and is operated in such a way that fluid enters the lower chamber first and then passes to the upper chamber.

A cyclone apparatus constructed in accordance with the invention will now be described by way of example in greater detail with reference to the accompanying drawing which is an axial section.

Referring to the drawing, the lower chamber 1 is provided with a tangential fluid inlet 2 and a heating or cooling jacket 3, which in its turn is provided with a tangential fluid inlet 4 and a tangential fluid outlet 5. Between the wall of the lower chamber 1 and the jacket 3, there is provided a helical guide 6 and ribs 7. The upper chamber 8 is provided with a tangential fluid outlet 9 and a heating or cooling jacket 10, which is provided with a tangential fluid inlet 11 and a tangential fluid outlet 12. Between the wall of the upper chamber 8 and the jacket 10, there are provided a helical guide 13 and ribs 14.

A tube 15, which has a double wall 16 to enable heat to be supplied to or extracted from the tube 15, provides communication between the lower chamber 1 and the upper chamber 8. Between the walls 16 of the tube 15, there are provided helical pipes 17 and 18. The upper end of the pipe 17 is open, as shown at 19, and the lower end leads to an inlet 21 which, in the drawing, is shown rotated from its true position through 90° about the vertical axis of the apparatus. Similarly, the lower end of the pipe 18 is open, as shown at 20, and the upper end leads to an offtake 22, which is also shown correspondingly rotated from its true position.

The lower chamber 1 has a central opening 23, which can be closed and which can be used for the discharge of solid matter that has been separated from fluid flowing through the lower chamber 1 and the tube 15. The upper chamber 8 has a similar opening 24, which may be used as a clearing hole. The opening 24 also enables the chambers 1 and 8 to be interchanged.

The apparatus is used in the following way. Fluid enters the lower chamber 1 through the inlet 2 and flows, as indicated by the curve 25, downwardly and inwardly to the lower end of the tube 15, up the tube 15 to the upper chamber 8, and then downwardly and upwardly to the outlet 9. A fluid is also passed through the jackets 3 and 10. This latter fluid is introduced through the inlet 11 and flows upwardly (following a helical path determined by the helical guide 13) to the outlet 12. From the outlet 12 the fluid flows downwardly through a conduit 26 (which is indicated in the drawing by a dot-dash line) to the inlet 4 at the lower end of the jacket 3. There the fluid flows upwardly (following a helical path determined by the helical guide 6) to the outlet 5. Thus the fluid flowing through the jackets 3 and 10 and the fluid flowing through the chambers 1 and 8 are in countercurrent. If it is desired that the two fluids should flow in the same direction, then the direction of flow of the fluid flowing through the jackets 3 and 10 is reversed.

A further fluid (which, for example, if the cyclone apparatus is being used for carrying out an exothermic reaction, may be a coolant) flows through the double wall 16 of the tube 15. This fluid enters the pipe 17 through the inlet 21, flows upwardly through the pipe 17 and leaves the pipe 17 at the open upper end 19 of the pipe 17. It then flows downwardly outside the path but between the walls 16 and following a helical path (determined first by the pipe 17 and then by the path 18) until it reaches the open lower end 20 of the pipe 18, through which it flows upwardly to the offtake 22.

In addition to the recovery of the pressure energy, this cyclone apparatus has the further advantage over a conventional cyclone that the two chambers can be used as two reaction spaces.

I claim:

1. A heat exchanging device comprising a pair of axially aligned chambers having substantially smooth inner surfaces of revolution disposed about longitudinal axes, said chambers being separated from each other by a partition, a hollow-walled tube having substantially smooth external surfaces mounted coaxially within said chambers and extending axially at least halfway into both of them through said partition to provide a channel of communication between said chambers, an inlet tube and an outlet tube respectively tangentially connected to said chambers in the vicinity of said partitions to respectively constitute them as inlet and outlet chambers and to cause a gaseous fluid introduced through said inlet to spirally flow through said inlet and outlet chambers in a smooth manner around and within said tube, and conduit means connected to said hollow-walled tube for conducting another fluid through said tube in heat exchange relationship with said gaseous fluid smoothly flowing in a spiral path around and through said tube.

2. A heat exchanging device as set forth in claim 1 wherein said surfaces of said chambers and said tube are cylindrical.

3. A heat exchanging device as set forth in claim 1 wherein said tube extends at least three-quarters the length of said chambers.

4. A heat exchanging device as set forth in claim 1 wherein said inlet and outlet tubes are disposed adjacent said partition.

5. A heat exchanging device as set forth in claim 1 wherein a jacket surrounds said chambers and provides a space around it, a continuous helical guide is disposed in said space between said jacket and said chambers, and inlet and outlet means are connected to said space for conducting still another heat exchange fluid through said space between said jacket and said chambers.

6. A heat exchanging device as set forth in claim 1 wherein a helical coil of pipe is provided within the hollow walls of said tube for conducting said other fluid through said tube.

7. A heat exchanging device as set forth in claim 6 wherein said helical coil has an open end disposed within said hollow wall to permit said other fluid to flow within and around the outside of said coil in passing through said hollow wall.

References Cited in the file of this patent

UNITED STATES PATENTS

| | | |
|---|---|---|
| 2,424,122 | Schneider | July 15, 1947 |
| 2,437,294 | Dalin | Mar. 9, 1948 |
| 2,487,633 | Breslove | Nov. 8, 1949 |
| 2,519,028 | Dodge | Aug. 15, 1950 |
| 2,536,752 | Kingston | Jan. 2, 1951 |
| 2,676,667 | Dodge | Apr. 27, 1954 |

FOREIGN PATENTS

| | | |
|---|---|---|
| 641,357 | Great Britain | Aug. 9, 1950 |